July 2, 1935. R. F. PEO Re. 19,631

SHOCK ABSORBER

Original Filed May 4, 1931 4 Sheets-Sheet 1

Inventor

Ralph F. Peo

By Tobie & Power

Attorneys

SHOCK ABSORBER

Original Filed May 4, 1931 4 Sheets-Sheet 2

Inventor

Ralph F. Peo

By Pollock & Powers

Attorneys

July 2, 1935. R. F. PEO Re. 19,631

SHOCK ABSORBER

Original Filed May 4, 1931 4 Sheets-Sheet 3

Inventor

Ralph F. Peo

By Popp & Powers

Attorneys

SHOCK ABSORBER

Original Filed May 4, 1931 4 Sheets-Sheet 4

Inventor

Ralph F. Peo

By Popp & Powers

Attorneys

Reissued July 2, 1935 Re. 19,631

UNITED STATES PATENT OFFICE 19,631

SHOCK ABSORBER

Ralph F. Peo, Buffalo, N. Y., assignor to Houde Engineering Corporation, Buffalo, N. Y., a corporation of New York Original No. 1,920,273, dated August 1, 1933, Serial No. 534,724, May 4, 1931. Application for reissue September 7, 1934, Serial No. 743,098

6 Claims. (Cl. 188—89)

This invention relates to a hydraulic shock absorber and the object is to provide improvements in means for locating and maintaining the partition associated with the working chamber in its proper position; also improvements in the check valve means for permitting the resistance liquid to flow through a by-pass from the low pressure end of a working chamber to the high pressure end of a working chamber but prevent reverse flow of resistance liquid through said by-pass; and also to provide improved metering means for regulating or controlling the amount of liquid which may pass back and forth between the high and lower pressure ends of a working chamber to suit the particular installation of the instrument, the character of the resistance liquid employed or other conditions.

Figure 1:
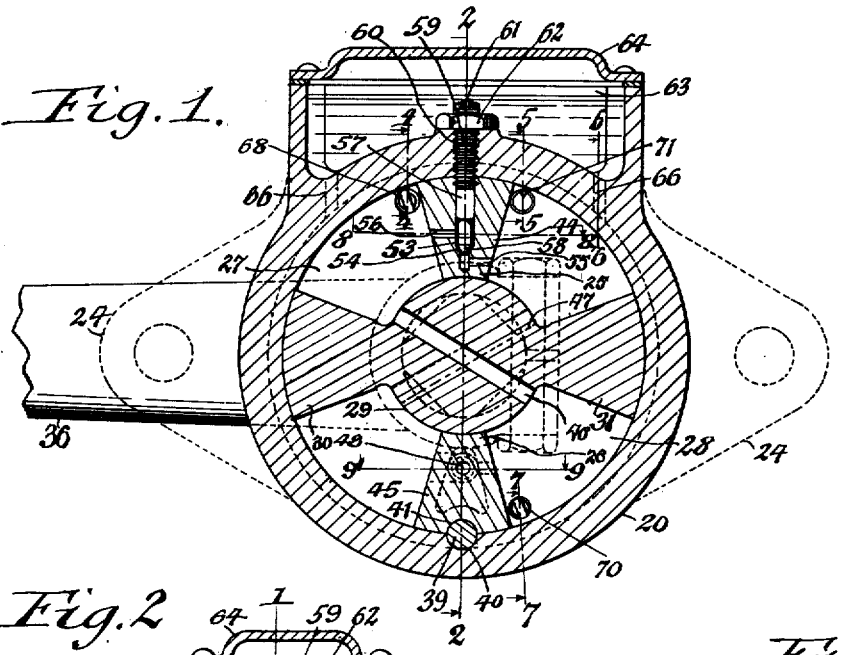
Figure 1 is a vertical transverse section of a hydraulic shock absorber taken on line 1—1 Fig. 2 and showing one form of my invention.
Figure 8:
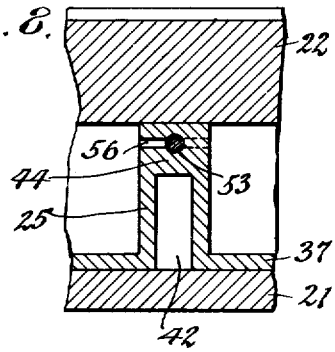
Figure 9:
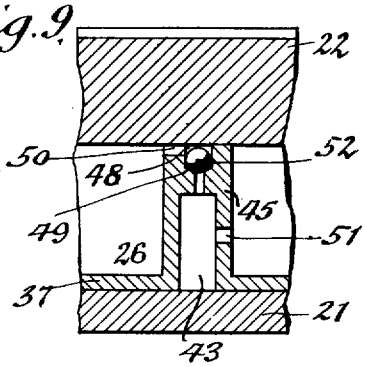
Figure 6:
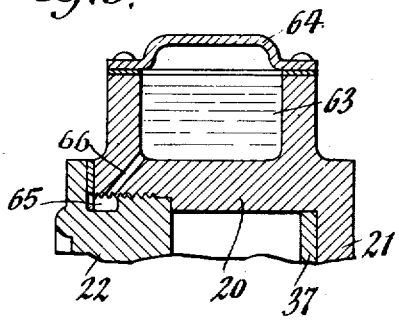

Figures 8 and 9 are fragmentary horizontal sections taken on lines 8—8 and 9—9 Fig. 1, respectively.

Figure 10:
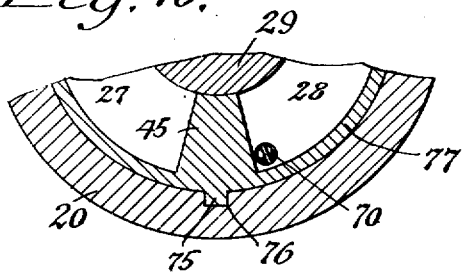

Figure 10 is a fragmentary vertical transverse section showing a modified form of means for anchoring the annular partition locating member in the working chamber.

Figure 11:
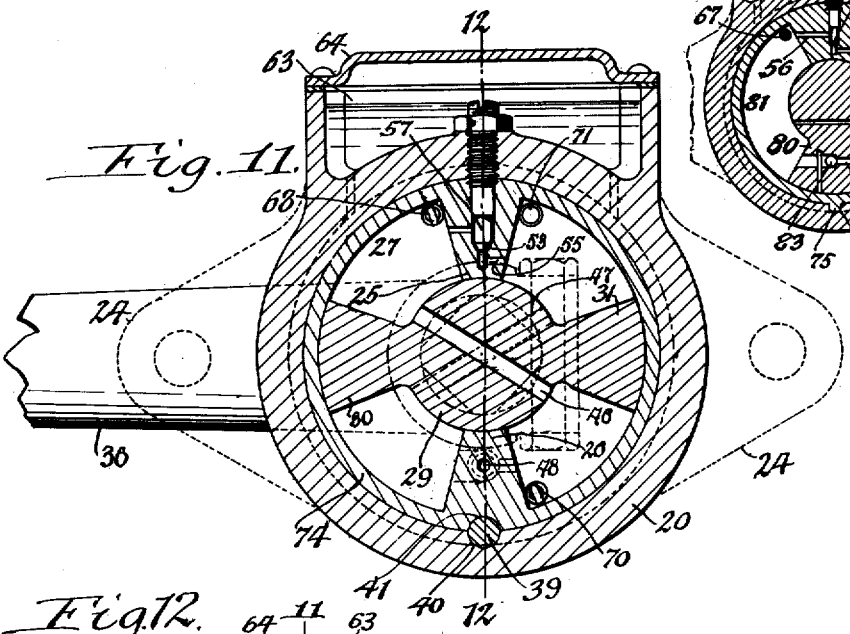

Figure 11 is a vertical longitudinal section of a hydraulic shock absorber showing a modified form of the partition locating means.

Figure 12:
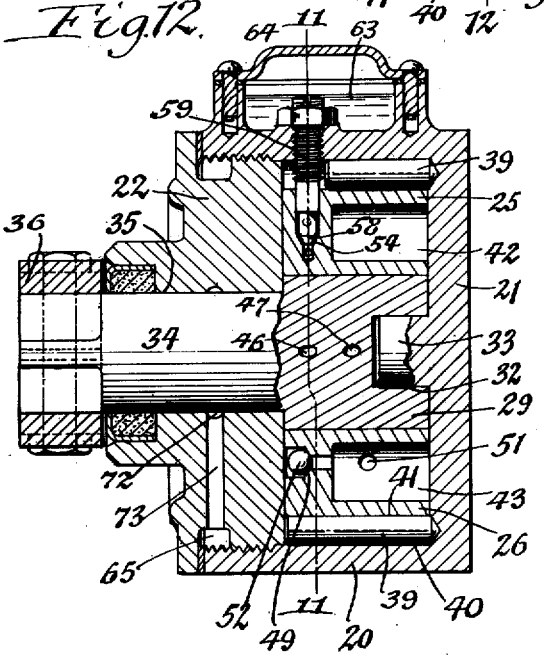

Figure 12 is a vertical longitudinal section taken on line 12—12 Fig. 11.

Figure 13:
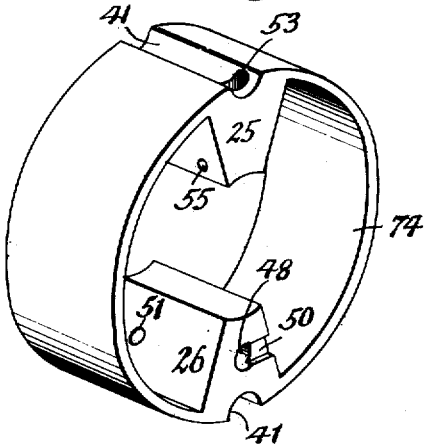

Figure 13 is a perspective view of the partitions and the means for locating the same shown in Figs. 11 and 12.

Figure 14:
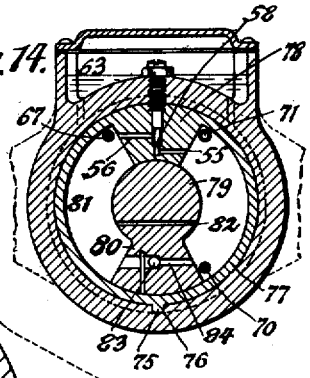

Figure 14 is a vertical transverse section, on a reduced scale, showing my invention embodied in a hydraulic shock absorber having a single working chamber, piston and partition.

Figure 15:
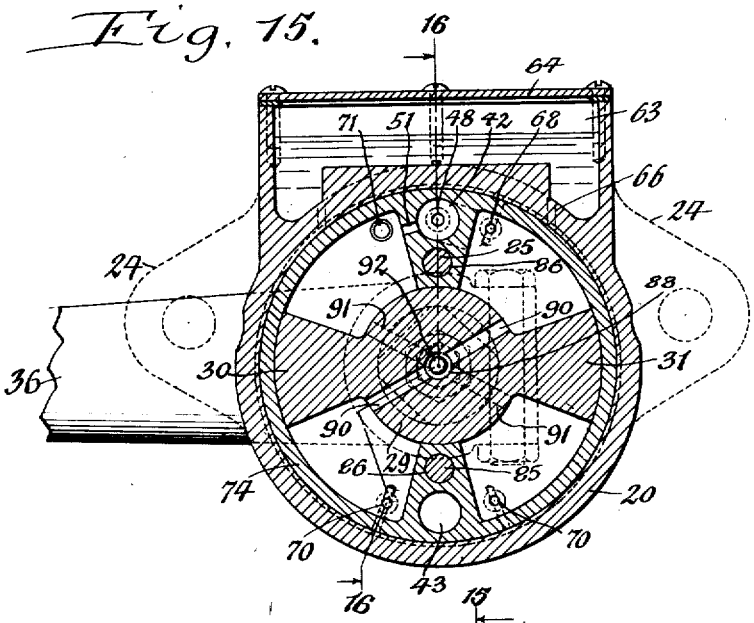
Figure 16:
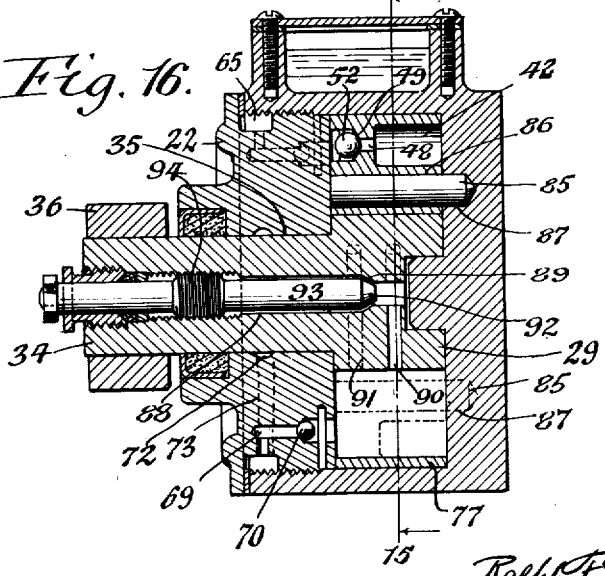

Figure 15 is a vertical transverse section of a slightly different form of hydraulic shock absorber from that shown in Figs. 1–14 embodying my invention, taken on line 15—15 Fig. 16.

Figure 16 is a vertical longitudinal section of the same taken on line 16—16 Fig. 15.

In the following description similar characters of reference indicate like parts in the several figures of the drawings.

Referring to the construction represented in Figs. 1–9, the numeral 20 represents the peripheral or circular wall of the body or enclosing casing of the shock absorber, the numeral 21 represents the fixed rear transverse wall of this body and 22 the removable transverse front wall of the same, said rear wall being preferably formed integrally with the peripheral wall 20 and the front transverse wall being preferably connected with the peripheral wall by means of a screw joint 23.

This body is adapted to be mounted on one of the relatively movable parts between which the shock is to be absorbed, for instance the frame and axle of an automobile, for which purpose the rear wall of the body may be provided with laterally projecting lugs 24 which are bolted or otherwise secured to this frame.

The cylindrical space within this housing or body is divided by two partitions or partition sections 25, 26 which are arranged on diametrically opposite sides of the axis of the housing or body and preferably above and below this axis, as shown in Fig. 1, thereby dividing the space within the housing into semi-cylindrical working chambers 27 and 28 which are adapted to contain a resistance liquid for absorbing shock. The partitions 25 and 26 have their opposing inner ends separated from each other by an intervening gap containing a circular hub 29 which bears with its periphery against the inner ends of the partitions 25 and 26 and is provided on diametrically opposite sides with pistons 30, 31 adapted to oscillate or move back and forth, respectively, in the working chambers 27 and 28. At its rear end the piston 29 is provided with a central bearing recess 32 which receives a bearing pin 33 projecting forwardly from the rear casing or body wall 21 and on its side this hub is provided with a forwardly projecting shaft 34 which is journaled in a bearing 35 on the front head 22 of the housing or body. At its outer front end the shaft 34 is provided with an operating arm 36 which is adapted to be connected with the other relatively movable part between which the shock is to be cushioned, such for example as the axle of the automobile which moves relatively to the frame of the same.

The two partitions 25 and 26 are held in their proper position within the housing and in spaced relation with reference to each other so as to form the working chambers within the body by means of a locating member 37 which is preferably of annular or ring form, and in the construction shown in Figs. 1–9 has the form of a flat disk which engages with the inner or front side of the rear casing head 21 and is connected on diametrically opposite sides of its center with the rear ends of the partitions 25, 26 and provided on its central part with a centering opening 38 which receives the bearing pin 33 on the rear wall of the casing.

This locating ring and the two partition sections arranged on diametrically opposite parts thereof are preferably formed integrally from any suitable material by die-casting or otherwise, so that the same is in a practically finished state and may be slipped into the bore of the casing and the same is ready for use and requires little, if any, machining or fitting in order to put the same in shape for cooperation with the other parts of the shock absorber which engage therewith. It is preferable to employ zinc as the material for making the integral locating ring 37 and the partitions 25 and 26 but if desired other materials may be used, such as aluminum, brass, bronze, bakelite or similar materials which are capable of this method of fabrication.

The pistons 30 and 31 engage at their outer ends with the bore of the peripheral wall 20 of the casing, the front sides of the same engage with the inner side of the front head 22 and the rear sides of the partitions engage with the inner or front side of the disk shaped locating ring 37 which connects the partitions. The piston bears with its rear end against the inner or front side of the locating ring 37 and with its front end against the inner side of the front head 22. Rotation of the partitions and the locating ring connecting the same is prevented by means whereby these parts are interlocked with each other. The form of these interlocking means, shown in Figs. 1 and 2, consists of longitudinal dowels or joint pins 39, each of which crosses the joint between the outer end of one of the partitions and the adjacent part of the bore of the peripheral wall 20 and is fitted in a cylindrical seat formed partly in the bore of the peripheral wall by means of a semicylindrical groove 40, and partly in the outer end of the respective partition by means of semicylindrical groove 41 formed in the latter so that these opposing grooves 40 and 41 together produce a cylindrical seat which corresponds to the cylindrical form of the locking pin or dowel 39 which is fitted tightly therein.

The connection of the partitions by means of the locating ring which is formed integrally therewith permits of definitely positioning the partitions within the casing and also anchoring the same therein so that the same are not likely to become displaced relatively to each other. Furthermore the mounting of the partitions within the body in this manner can be accomplished by preliminarily die-casting the partitions and the locating ring as an integral unit and also fastening these members within the casing by comparatively simple means, thereby materially reducing the machining which has heretofore been necessary for this purpose and reducing the cost of the instrument as a whole accordingly.

In order to reduce the amount of material in the partitions 25 and 26 the same are preferably made of hollow form and in the preferred construction these partitions are provided in their rear parts with cavities 42, 43 which are open at the rear ends of these partitions while the front ends of these partitions are closed by means of blocks or webs 44, 45 which serve as valve housings as will appear later on. By thus hollowing the partitions a considerable amount of metal or other material is saved of which these partitions and the locating ring are made, and thereby effecting an economy in the manufacture of the same.

Figure 2:
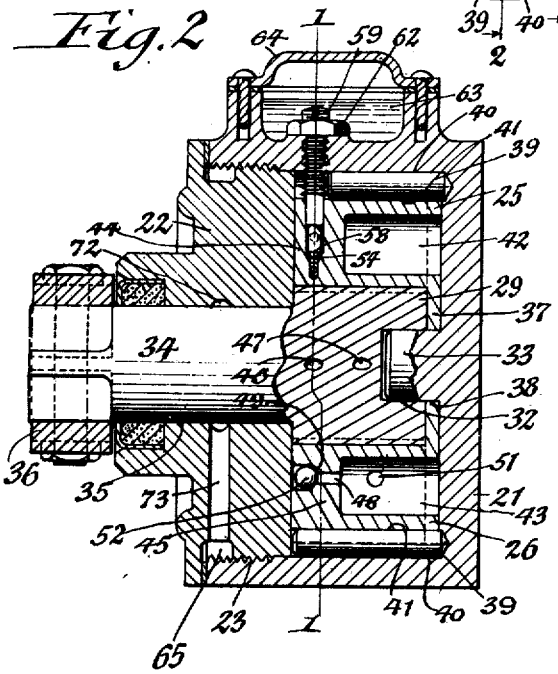
Figure 2 is a vertical longitudinal section of the same taken on line 2—2 Fig. 1.

During the oscillating movement of the pistons in the working chambers as the frame and axle of the body move toward and from each other while the car is in operation, some of the resistance liquid is permitted to pass back and forth between the high and low pressure ends of one working chamber, and the high and low pressure ends of the other working chamber by means of a high pressure balancing passage 47 formed diametrically in the hub and connecting the high pressure ends of the working chambers, and a low pressure balancing passage 46 formed diametrically in the hub and connecting the low pressure ends of the working chambers, as shown in Figs. 1 and 2.

During the low pressure strokes of the pistons some of the resistance liquid is free to pass through the lower partition 26 from the lower or low pressure end of the working chamber 28 to the lower or high pressure end of the working chamber 27 but during the high pressure strokes of the pistons a reverse movement of the resistance liquid through this partition 26 from the lower or high pressure end of the working chamber 27 to the lower or low pressure end of the working chamber 28 is prevented by means of a check valve device which preferably consists of a valve chamber 48 arranged lengthwise in the lower housing 45 and having a central valve seat 49, and opening at its rear end into the pocket or cavity 43, while its front end opens to the front side of the respective partition 26, an outlet passage 50 formed on the front side of the partition 26 and extending laterally from the valve chamber 48 to the lower end of the working chamber 27, and an inlet passage 51 extending from the cavity 43 through the lower partition 26 to the lower end of the working chamber 28, as shown in Figs. 1, 2, 3 and 9.

Within the valve chamber 48 is arranged a check valve 52 preferably of the ball type which is movable toward and from the seat 49, this ball being slightly smaller in diameter than the width of the valve chamber 48 and also less in diameter than the distance from the valve seat 49 to the inner side of the front head 22. It follows from this that during the low pressure strokes of the pistons the check valve 52 will be forced away from its seat and permit liquid to pass from the lower end of the working chamber 28 through the passage 51, valve chamber 48 and passage 50 into the lower end of the working chamber 27; but during the reverse movement of these pistons the check valve 52 will engage the seat 49 and prevent a return flow of the resistance liquid through these passages 50 and 51 and the valve chamber 48, thereby causing the liquid to offer a greater resistance to the movement of the pistons during the high pressure strokes than during the low pressure strokes and thereby govern the shock absorbing action of the instrument accordingly.

This manner of constructing the check valve device in the lower partition is materially simplified compared with the means heretofore employed for this purpose, thereby effecting a substantial economy in manufacture.

In order to adapt the instrument for absorbing shocks of different loads and also permit of using resistance liquid of different kinds, regulating or metering means are provided which permit some of the resistance liquid to flow back and forth between the working chambers to suit the particular installation and also the character of the liquid which is used. Although various means may be employed for this purpose, those shown in the drawings are preferable and are constructed as follows:

The numeral 53 represents an upright valve chamber formed in the housing 44 of the upper partition 25 and opening through the top thereof and provided between its upper and lower ends with an upwardly facing valve seat 54. The lower end of this valve chamber 53 is connected by means of a passage 55 with the upper end of the working chamber 28 and above the valve seat 54 the valve chamber 53 is connected by means of a lateral port 56 with the upper end of the working chamber 27. Within the valve chamber 53 is arranged a valve stem 57 which is provided with a regulating or metering valve 58 which is movable toward and from the valve seat 54 for regulating the freedom of movement of the resistance liquid through the metering or regulating passages 55 and 56 and the valve chamber 53.

The position of this metering or regulating valve relative to its seat 54 may be adjusted by an external screw thread 59 on the upper part thereof which engages with a correspondingly threaded opening 60 in the upper part of the peripheral wall 20 of the casing or body, which threaded opening 60 is vertically in line with the valve chamber 53. This valve stem may be turned by engaging a screw driver or similar instrument with a nick 61 in the upper end of the valve stem, and after such adjustment this metering valve is held in position by means of a clamping nut 62 working on the upper threaded end thereof and engaging with the top of the peripheral wall 20.

Figure 4:
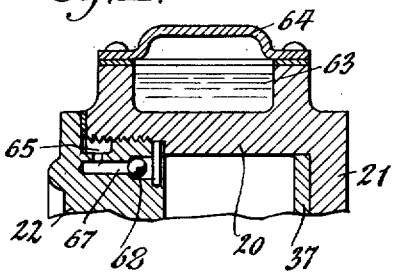
Figures 4, 5, 6 and 7 are fragmentary vertical sections taken on the correspondingly numbered lines in Fig. 1.
Figure 7:
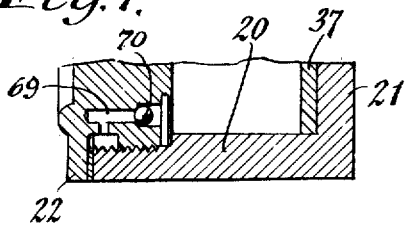

For the purpose of replenishing the working chambers with the resistance liquid when required, means are provided which include a reservoir or replenishing chamber 63 which is arranged on top of the peripheral wall 20 and adapted to be filled through an opening in its top which is normally closed by a cover 64. The resistance liquid is conveyed from this replenishing chamber or reservoir to the working chambers by an annular passage 65 formed between the periphery of the front casing head 22 and the bore of the peripheral wall 20 at the front ends of these parts, inlet passages 66 connecting opposite ends of the replenishing reservoir 63 with the upper parts of the annular passage 65, a check valve chamber 67 connecting the annular passage 65 with the upper part of the working chamber 27 and containing a check valve 68 which opens toward the respective working chamber but closes away from the same, as shown in Fig. 4 and a check valve chamber 69 connecting the lower part of the annular passage 65 with the lower part of the working chamber 28 and containing a check valve 70 which opens toward the respective working chamber but closes away from the same, as shown in Fig. 7.

It follows from this construction that during the high pressure strokes of the pistons in the working chambers resistance liquid will be drawn from the replenishing reservoir into the low pressure ends of the working chambers if a deficiency of liquid exists in these chambers; but during the low pressure or reverse strokes of these pistons the check valves 68 and 70 will close and prevent the return of any of the resistance liquid from the working chambers past these check valves into the replenishing reservoir.

Figure 5:
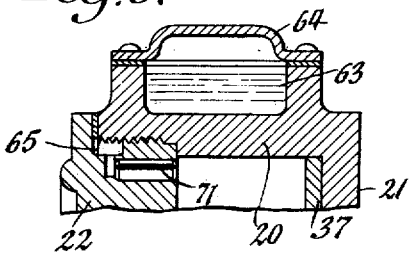

Any air which may be present in the resistance liquid is discharged from the upper end of the working chamber 28 into the annular passage 65 and thence through the passages 66 into the replenishing reservoir by means of a vent 71 formed in the upper part of the front wall 22, and extending from the upper part of the working chamber 28 to the annular passage 65, as shown in Figs. 1 and 5.

Any liquid which may creep forwardly between the bearing surfaces of the shaft 34 and the bearing 35 is intercepted by means of a groove 72 formed in the bore of the bearing 35 around the shaft 34 and conducted from this groove by means of a radial passage 73 to the annular passage 65 from which it is either returned to the working chambers or to the replenishing chamber as circumstances require.

Figure 3:
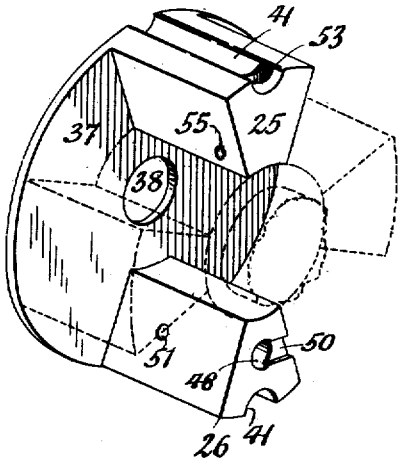
Figure 3 is a perspective view of a pair of partitions or partition sections connected by an annular locating member in accordance with this invention.

Instead of making the annular or ring shaped locating member which connects the upper and lower partitions 25 and 26 in the form of a flat disk, as shown at 37 in Figs. 2 and 3, this annular or ring shaped locating member may be constructed in the form of a cylinder, as shown at 74 in Figs. 11 and 13. In this case the locating ring covers the entire inner peripheral surface of the wall 20, and the pistons 30, 31 engage with the inner cylindrical surface of the locating ring 74 instead of engaging with the bore of the peripheral wall 20, and the pistons engage their front and rear sides with the front and rear walls 22, 21 respectively. In other respects however, the construction and operation of the instrument is substantially like that shown and described with reference to Figs. 1–9.

Instead of interlocking the partitions with the peripheral wall of the casing by means of dowels 39, as shown in Figs. 1–13, the same result may be accomplished by providing the cylindrical locating member 77 with one or more keys 75, each of which is preferably cast on the outer surface of the locating ring 77 and engages with a key seat or groove 76 in the bore of the peripheral wall 20, as shown in Figs. 10 and 14, and thereby prevents the respective locating ring and the partitions or partition sections connected therewith from becoming displaced circumferentially.

This instrument can be made to operate either in a clockwise or anti-clockwise direction by simply reversing the direction in which the passages 50 and 51 lead from the valve chamber 48 and the cavity 43 toward opposite sides of the lower partition 26, thereby facilitating the production of this instrument for functioning in either direction without any added cost.

It is to be understood that the present improvements are not to be confined to a shock absorber in which two partitions or partition sections are employed for dividing the interior of the casing into two working chambers, but that a different number of partitions may be employed. For instance, in the organization shown in Fig. 14 the cylindrical locating ring 77 which corresponds to the locating ring 74 shown in the construction of Figs. 11, 12 and 13, is provided with a single partition 78 and the hub 79 of the operating shaft is provided with a single piston 80 which oscillates in the working chamber 81 formed within the locating ring or member 77. The hub 79 is provided with a balancing passage 82 extending from one end of the working chamber to the other and the single piston 80 is provided with a check valve 83 controlling a by-pass 84 therein so that during the low pressure stroke of this piston the liquid is free to pass from the low pressure end to the high pressure end of the same, but during the high pressure stroke the resistance liquid in the working chamber is prevented from passing through this by-pass from the high pressure end of this working chamber to the low pressure end of the same.

In other respects this construction is substantially like that shown in Figs. 1–13.

In the modified form of shock absorber embodying my improvements, variations in the means for anchoring the locating ring and partition sections, the resistance liquid metering or regulating means and the check valved by-pass means are provided as follows:

The numeral 85 represents two dowel pins or anchoring keys each of which is arranged lengthwise in a horizontal opening 86 formed wholly within the inner part of each one of the partition sections 25 and projecting at its rear end into a recess 87 in the rear head or wall 21 of the body, thereby not only preventing the partitions and locating ring from turning but also reinforcing the partitions against lateral strains and strengthening the connection between the same and the body.

The resistance metering means in the construction shown in Figs. 15 and 16 comprise a longitudinal valve chamber 88 formed axially in the piston hub 29 and the operating shaft 34 and provided near its rear end with a forwardly facing valve seat 89, high pressure ports 90 arranged transversely in the hub and connecting the metering valve chamber in rear of the valve seat 89 with the high pressure ends of the working chambers, low pressure ports 91 arranged transversely in the hub and connecting the metering valve chamber in front of the valve seat 89 with the low pressure ends of the working chambers, and a metering or regulating valve 92 adjustable relatively to the valve seat 89 for regulating the flow of resistance liquid back and forth between the high and low pressure ends of the working chambers to suit different conditions, which adjustment is effected by a valve stem 93 arranged lengthwise in the valve chamber and has a screw connection 94 therewith and carries the valve 92 at its rear end while its front end projects beyond the front end of the operating shaft where the same is accessible for manipulation.

In this last mentioned construction the lower partition section 25 is not provided with a check valved by-pass but the upper partition section is provided with a check valve by-pass which is constructed and operates substantially like the check valve by-pass in the lower partition 25 of the form shown in Figs. 1–13 and the same reference characters are therefore applied to the corresponding parts.

The operation of the shock absorber shown in Figs. 15 and 16 is substantially the same as that shown in Figs. 1–14.

As a whole this instrument is very simple in construction, the same contains a minimum number of parts, the machine work required is reduced to a minimum and the same can be very readily adjusted for different loads and is not liable to get out of order.

I claim as my invention:

1. A hydraulic shock absorber comprising a hollow body having a circular inner side, a partition arranged within the body and forming a wall of a working chamber which is adapted to contain a resistance liquid, said partition being open at one end and closed at the other, a locating ring formed integrally with said partition and engaging the interior of said body and a piston adapted to oscillate in said working chamber.

2. A hydraulic shock absorber comprising a hollow body having a circular inner side, a partition arranged within the body and forming a wall of a working chamber which is adapted to contain a resistance liquid, said partition having a cavity at one end, a housing closing its opposite end, a passage leading from said cavity to one side of said partition, a valve chamber arranged in said housing and opening to the outer end of the same and provided with a valve seat, an outlet port formed on the outer side of said housing and leading to the other side of said partition and an inlet port in said housing leading from the valve seat to said cavity, a check valve arranged in said valve chamber and movable toward and from said seat, a locating ring formed integrally with said partition and engaging the interior of said body, and a piston adapted to oscillate in said working chamber.

3. A hydraulic shock absorber comprising a hollow body having a circular inner side, a partition arranged within the body and forming a wall of a working chamber which is adapted to contain a resistance liquid, said partition having a cavity at one end, a housing at its opposite end, a valve chamber in said housing provided with a valve seat and ports leading from opposite sides of said valve seat to opposite sides of said partition, a valve stem having an adjusting connection at its outer end with said body and a valve at its inner end which is movable toward and from said valve seat, and a piston adapted to oscillate in said working chamber.

4. In a hydraulic shock absorber, a body comprising a peripheral wall and end walls defining a cylindrical space, an integral structure fitting into said space and consisting of a cylindrical ring entirely open at both ends and a partition extending radially therefrom, said structure and end walls forming a hydraulic working chamber, and a piston adapted to oscillate in said chamber.

5. In a hydraulic shock absorber, a body comprising a peripheral wall and end walls forming a hydraulic working space, partition structure for dividing said space into working chambers, a cylindrical supporting and locating ring for said partition structure, said ring being open at both ends and being integral with said partition structure and forming a lining for said peripheral wall, and a piston structure oscillatable in said working chambers.

6. In a hydraulic shock absorber, a peripheral wall and end walls defining a cylindrical space, a bushing ring for said peripheral wall extending between said end walls, partition lugs extending radially inwardly from said ring between said end walls, said ring being integral with and holding said lugs spaced independently of said end walls, and a piston structure operable in the space between said lugs.

RALPH F. PEO.